Patented Oct. 17, 1939

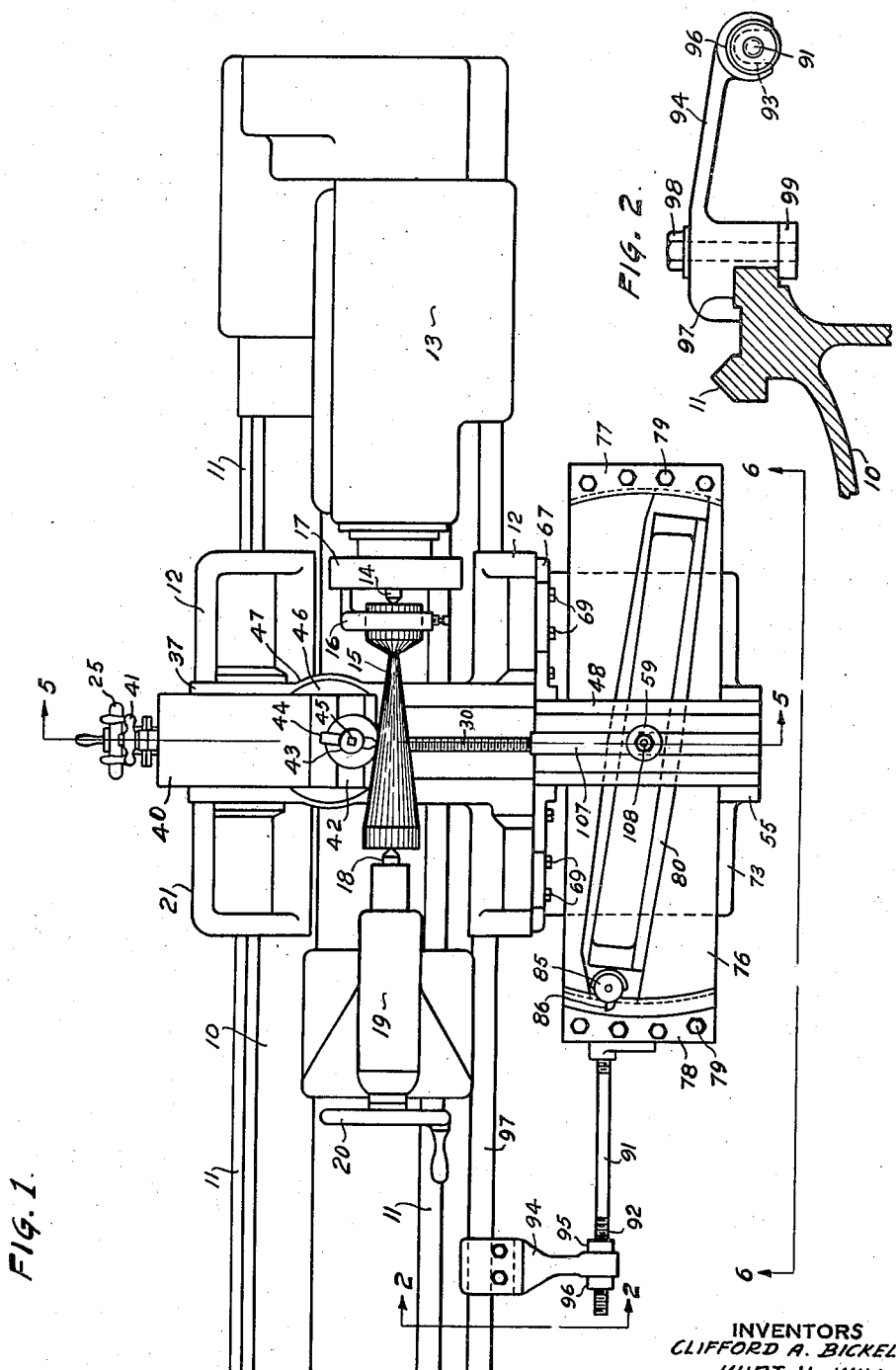

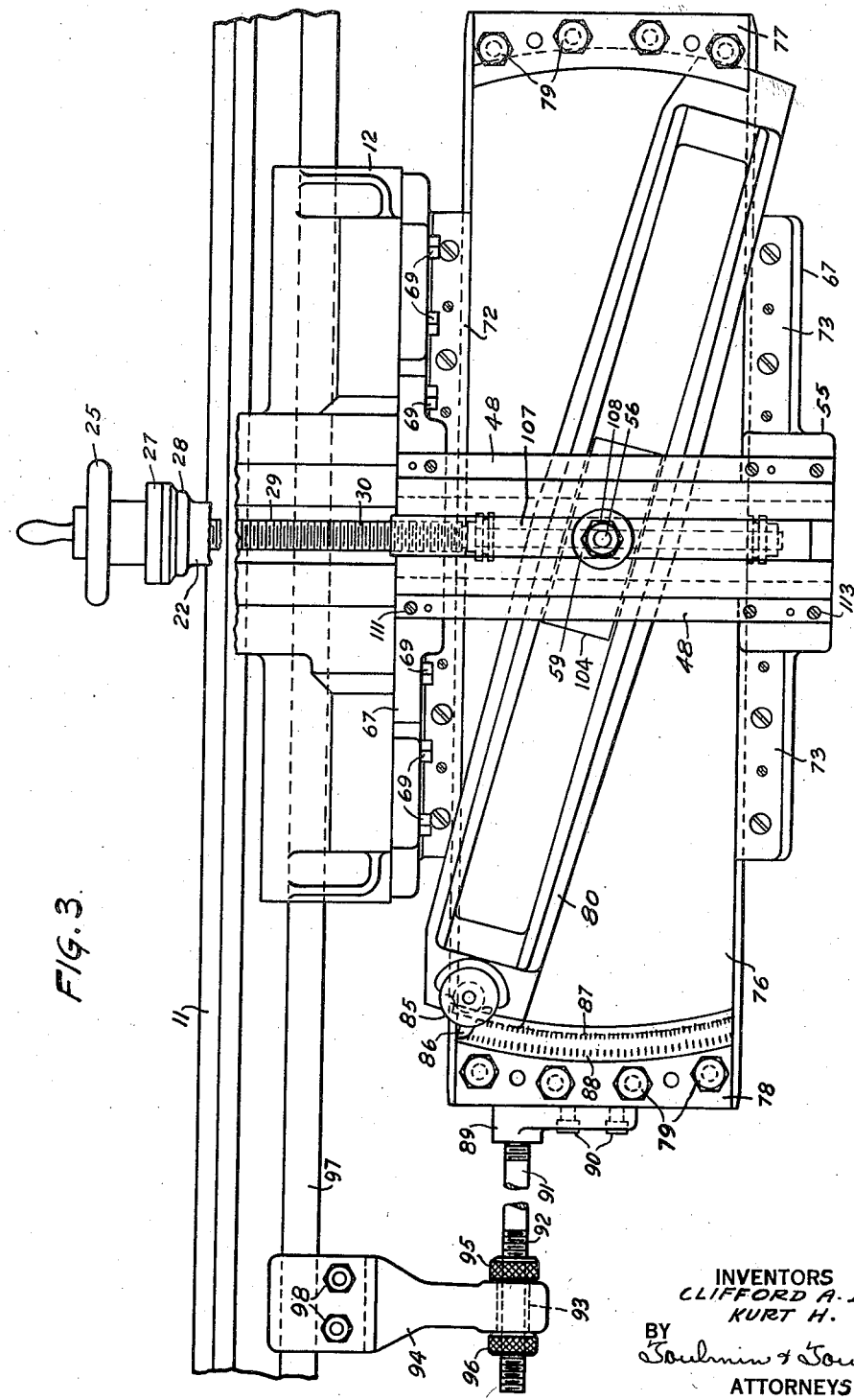

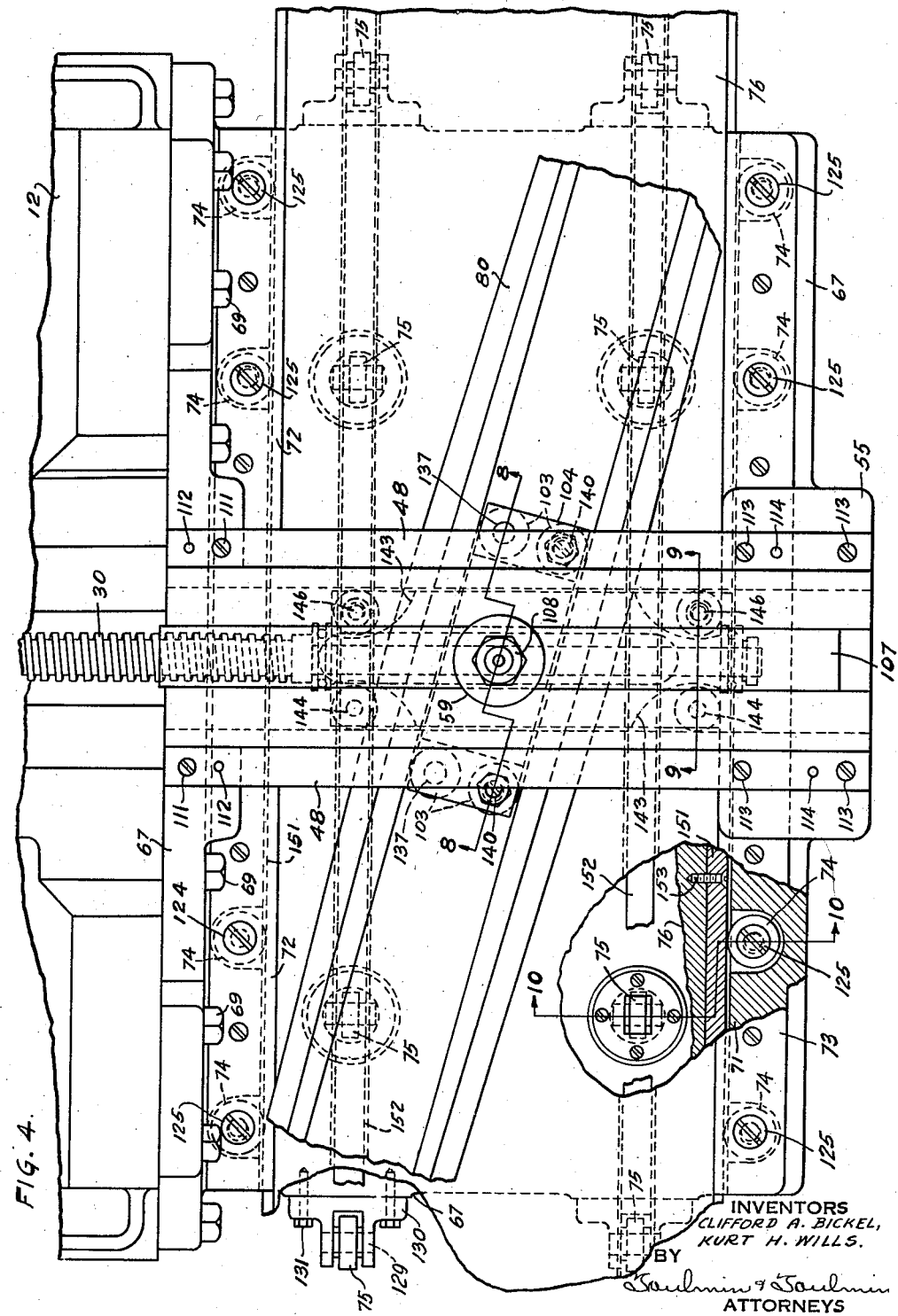

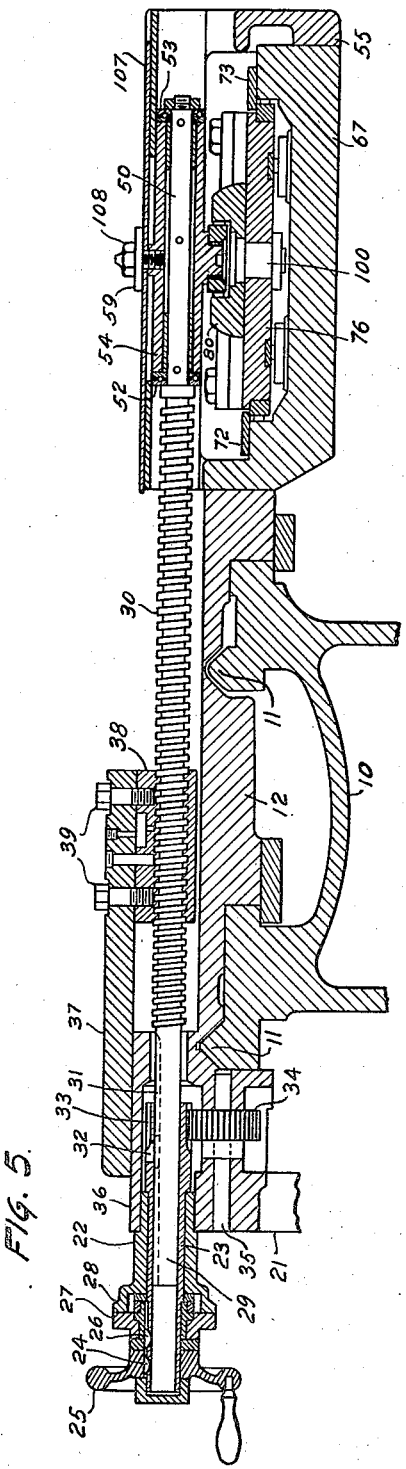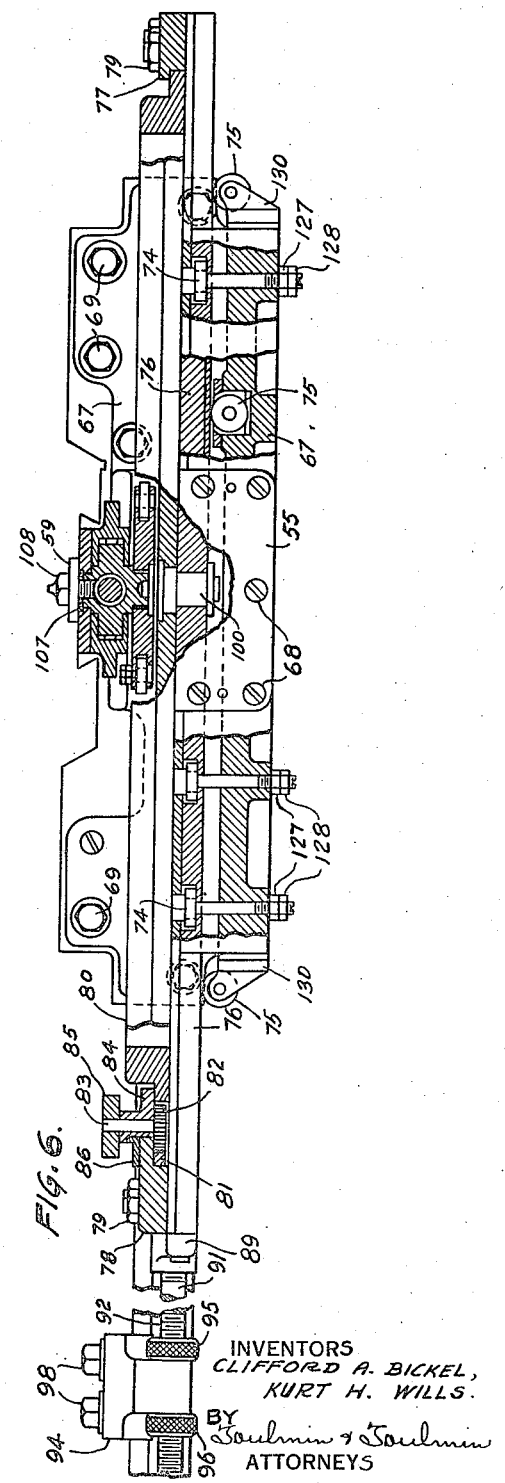

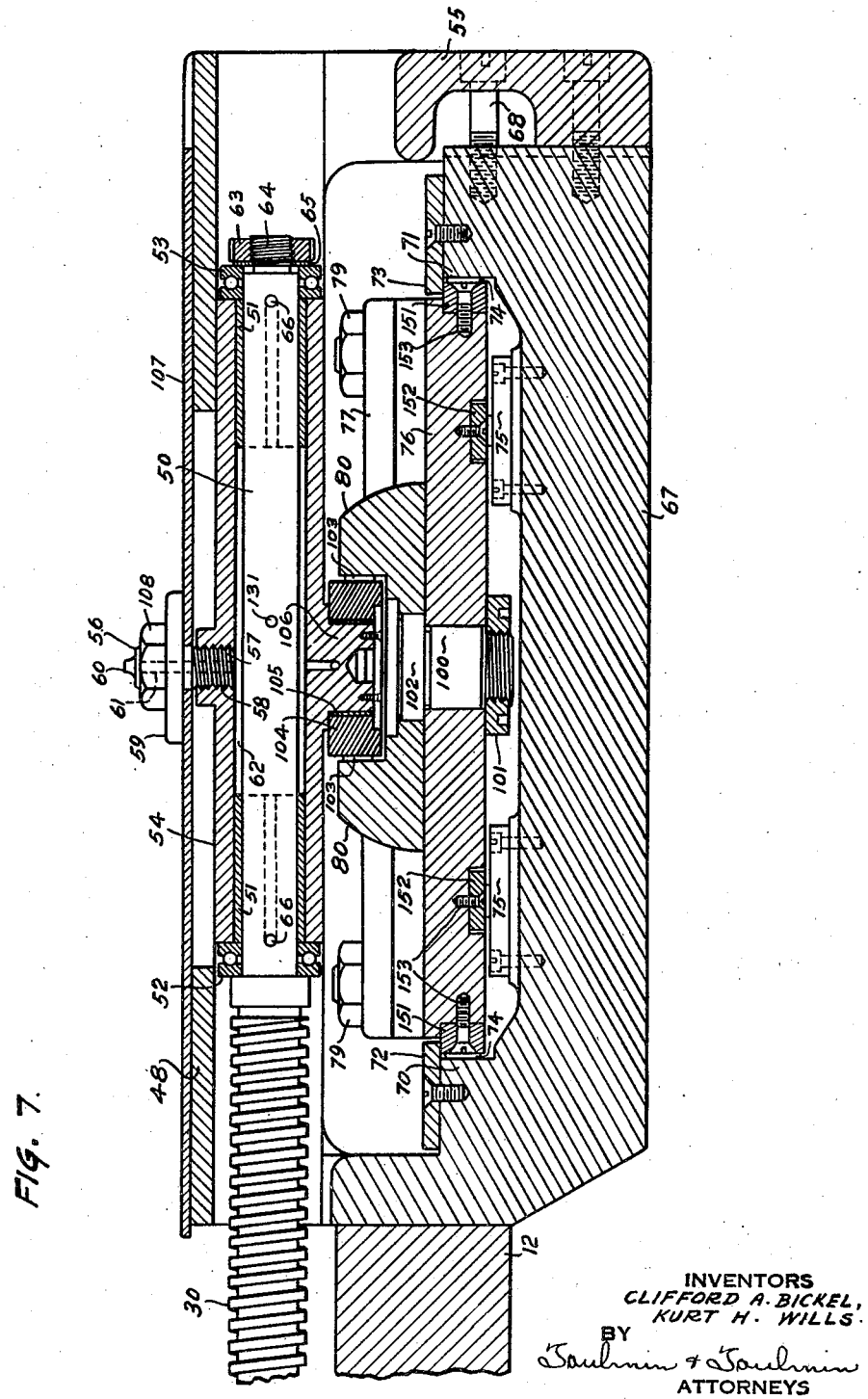

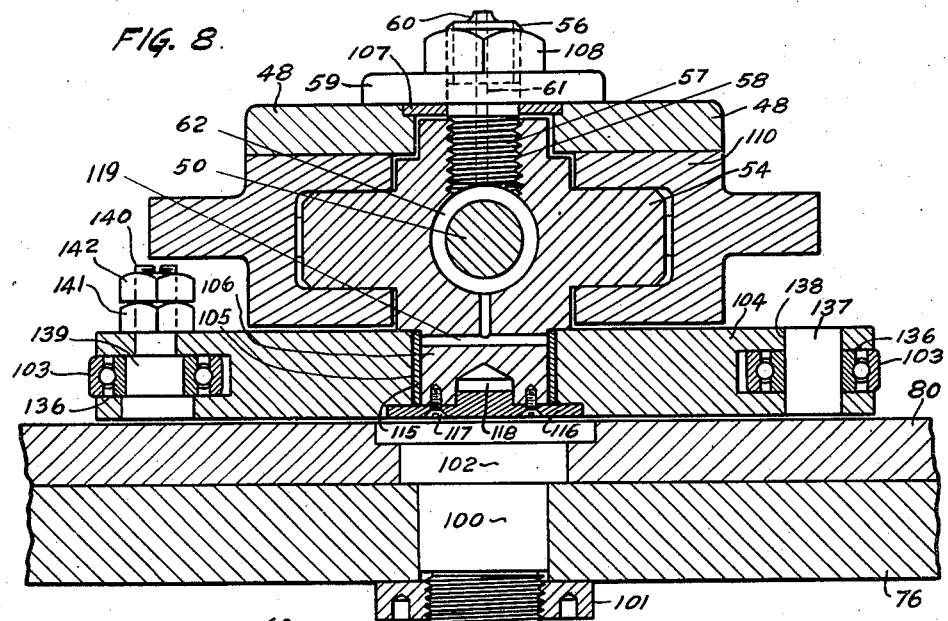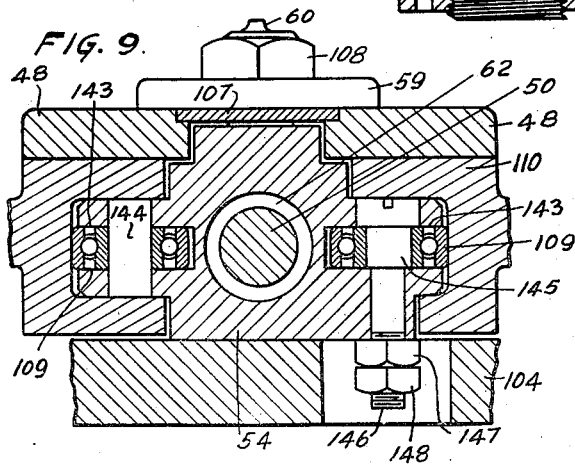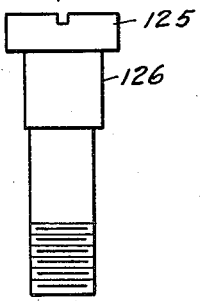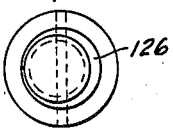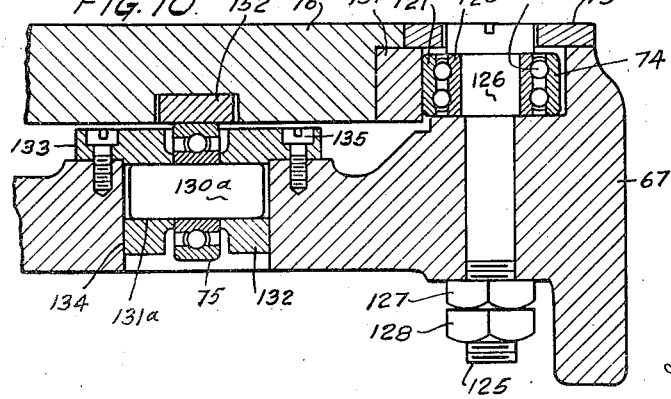

2,176,700

UNITED STATES PATENT OFFICE 2,176,700

TELESCOPIC TAPER ATTACHMENT

Clifford A. Bickel and Kurt H. Wills, Sidney, Ohio, assignors to The Monarch Machine Tool Company, Sidney, Ohio, a corporation of Ohio Application May 5, 1936, Serial No. 77,982

3 Claims. (Cl. 82—17)

This invention relates to turning apparatus, and in particular to apparatus for turning tapered articles by means of automatically regulated devices.

One object of this invention is to provide a taper-turning device having means associated therewith for automatically causing the cutting tool to follow a predetermined path so as to cut a taper with a predetermined angle, this device having means associated therewith for minimizing the friction and wear developed by the moving parts thereof, and eliminating the necessity for frequent adjustment to take up this wear.

Another object is to provide a device for use in connection with turning apparatus, or other machining apparatus, wherein the tool moves in a path at an angle to a given direction on the work-piece, the motion of the tool being regulated automatically by means associated with the machine, and adjustable to varying degrees of taper.

Another object is to provide such a taper machining device, wherein the tool is directly connected to the taper-guiding means so that the motion of the one is transmitted directly to the other, with substantially no lost motion therebetween.

Another object is to provide a taper-cutting device for use with a turning lathe, wherein the cross slide screw is connected at one end to the cutting tool and at the other end to a member capable of sliding in a guideway arranged at an angle to the axis of the work-piece, so that the guiding thrust from the member sliding in the guideway is directly transmitted through the screw to the cutting tool, this apparatus having anti-friction bearing means, preferably arranged between the relatively sliding members so as to minimize the friction therebetween, especially when the guideway is arranged at a relatively steep angle to the axis of the work-piece.

Another object is to provide a taper-turning device, of the above character, for attachment to the carriage of a turning lathe, this device being capable of being connected or disconnected at the will of the operator so that the lathe may be used for ordinary turning operations or for taper-turning operations, as desired.

In the drawings:

Figure 1 is a plan view of a turning lathe with the taper-turning device of the present invention associated therewith.

Figure 2 is a fragmentary side elevation, partly in section, taken along the line 2—2 of Figure 1, and showing the manner of attaching the bed dog of the taper-turning device to the bed of the lathe.

Figure 3 is an enlarged plan view of a portion of the apparatus shown in Figure 1, showing the taper-regulating devices in greater detail.

Figure 4 is a still further enlarged plan view, partly in section, of the devices shown in Figure 3.

Figure 5 is a vertical section in the plane of the cross slide screw taken substantially along the line 5—5 of Figure 1.

Figure 6 is an elevational view in section where partly broken away, and looking in substantially the direction of the lines 6—6 in Figure 1.

Figure 7 is an enlarged view of the apparatus shown at the right-hand end of Figure 5.

Figure 8 is an irregular section taken along the line 8—8 in Figure 4, showing the adjustable and non-adjustable anti-friction bearings used in this invention.

Figure 9 is a section taken along the line 9—9 in Figure 4.

Figure 10 is a section taken along the line 10—10 in Figure 4.

Figure 11 is a side elevation of the eccentric supporting stud for adjustably mounting the anti-friction bearings.

Figure 12 is a bottom plan view of Figure 11.

General construction

In general, the taper-turning device of this invention consists of a guideway or swivel which may be attached to the lathe, or other machine tool, this swivel having a guideway within which moves a member operatively connected to the cutting tool in such a manner that as the member slides down the guideway the tool follows a similar path along the work-piece. Accordingly, when the guideway is arranged at an angle to the axis of rotation of the work-piece the cutting tool will cut a corresponding taper upon the work-piece. In particular, the sliding member is operatively connected at one end to the cross slide screw, the opposite end of which is connected to the cutting tool, and anti-friction bearings of a novel type are employed to minimize the friction which would otherwise exist between the relatively sliding parts. An anchorage block or bed dog is provided for releasably anchoring the device to the bed of the lathe so that the device may be used or rendered inoperative at the will of the operator.

Hitherto, in turning tapered work-pieces, it has been necessary for the operator to devote his constant attention to feeding the tool at the proper speed to remove the proper amount of material in order to produce the proper amount of taper. The taper-turning devices hitherto in use have been suitable only for cutting tapers of relatively small angles. When a work-piece having a steep taper is cut with such devices, the friction existing between the tool-guiding member and the guideway in which it moves has been so great that such devices have not been practical under such conditions. The friction thus developed also gave rise to considerable wear, and this in turn, created inaccuracy in the taper produced. By reason of this wear frequent adjustment was also required, this adjustment necessitating the moving of the guideways or slideways toward one another to take up the excessive clearances. Such devices have also employed independent members for transmitting the thrust from the sliding member to the cutting tool, whereas the present device employs the cross slide screw itself for transmitting this guiding force. To eliminate this friction the applicants provide the special type of anti-friction bearing disclosed in the present specification and drawings. This feature also reduces the wear, and consequently eliminates the need for frequent adjustment of the device, as is necessary in prior devices of this nature.

Referring to the drawings in detail, Figure 1 shows a lathe having a bed 10 with longitudinal ways 11 on the upper portion thereof. Upon these ways travels the lathe carriage, generally designated 12, this being moved to and fro in the usual manner by a lead screw (not shown) or by the usual hand wheel and rack (not shown). The lathe is provided with a head stock, generally designated 13, which contains the driving mechanism for rotating the live spindle 14, and through it the work-piece 15. The driving connection is made in any suitable manner, the means shown being the dog 16 attached to the work-piece 15, and engaging a slot in the face plate 17. When the face plate 17 is rotated by the mechanism within the head stock 13, the rotation of the face plate 17 will rotate the work-piece 15 by the connection through the dog 16. At its opposite end the work-piece 15 is supported by the bed spindle 18 supported in the tail-stock 19, and movable to and fro by means of the hand wheel 20. The tail-stock 19 is slidable along the bed of the lathe in the usual manner, and may be clamped in any desired position in customary ways.

Carriage construction

The lathe carriage 12 is provided with an apron 21 which extends downwardly in front of the lathe, and which contains the various controls for manually regulating the motion of the carriage. Mounted on the carriage 12 is a support 22, in which is journalled a sleeve 23. Operatively connected to the outer end of the sleeve 23, as by the key 24, is a hand wheel 25 by means of which the sleeve 23 may be rotated manually. Also keyed to the sleeve 23, as by the key 26, is a micrometer head 27, by means of which the feeding motion of the hand wheel 25 may be regulated as to the amount by which it feeds the cutting tool to the work-piece. The support 22 is provided with a corresponding hub-like portion 28 adapted to bear a suitable index mark and a vernier so as to enable the setting of the micrometer head 27 to be accurately regulated.

Supported within the sleeve 23 is the outer end of the cross feed screw 29 having screw threads 30 in its intermediate portion. The outer end of the cross feed screw 29 is provided with a keyway 31 adapted to receive a key 32, secured to the sleeve 23 in such a manner as to form a driving connection therebetween and yet to permit the cross feed screw 29 to be moved telescopically into and out of the sleeve 23. The inner end of the sleeve 23 is provided with teeth forming a driving pinion 33 which meshes with a drive gear 34, mounted upon a jack shaft 35 within the apron 21. The drive gear 34 is operatively connected by means of conventional gearing to the feed rod of the lathe so that the rotation of the feed rod will cause the rotation of the drive gear 34, with consequent rotation of the sleeve 23 and the cross feed screw 29.

Reciprocably mounted on the portion 36 of the carriage 12 is the bottom slide 37, to which is secured the cross feed nut 38, as by the bolts 39. Consequently, when the cross feed screw 29 is rotated the nut 38 is caused to move along the threaded portion 30, and carries the bottom slide 37 to and fro in a direction transverse to the longitudinal ways 11 on the lathe bed. The bottom slide 37 is provided with the usual compound slide or tool slide 40 (omitted for sake of clearness from Figures 3 to 7, inclusive, but shown in Figure 1). The tool slide 40 is of conventional construction, and is supported slidably upon the bottom slide 37 in such a manner as to be moved to and fro relatively thereto when the hand crank 41 (Figure 1) is rotated by the operator. The tool slide 40 is provided with a slotted portion 42, within which is mounted the tool post 43 having the cutting tool 44 held thereby. The tool post clamping screw 45, when rotated in one direction, serves to clamp the tool post 43 in the grooved portion 42 and also to firmly secure the tool 44 within the tool post 43. The compound slide 40 is also capable of being swung angularly in the usual manner, it being provided with a turntable portion 46, which cooperates with a similar portion 47 upon the bottom slide 37.

Taper-regulating mechanism

The right-hand end of the cross feed screw 29 (Figure 5) is provided with a reduced diameter portion 50, which is journalled in bearings 51 (Figure 7) and provided with anti-friction thrust bearings 52 and 53. The bearings 51 may be of any suitable type, the type illustrated consisting of bronze bushings. The bearings 51 are mounted in the carriage shoe 54, which is slidably mounted in the guide members 110 (Figure 8), upon which rest the elongated plates 48. The carriage shoe 54 is provided with a threaded hole 58 adapted to receive the threaded portion 57 of the threaded stud 56, the latter having a washer 59. An oiling connection 60 in the threaded stud 56 opens into a passageway 61 therethrough, so that the space 62 around the reduced diameter portion 50 may be filled with lubricant to lubricate the bearings 51, 52 and 53. The retaining nut 63, threaded onto the threaded end 64 of the cross feed screw 29, engages a washer 65, which in turn, engages the thrust bearing 53 and holds in assembly the parts associated with the cross feed screw 29. The bushings 51 are provided with passages 66 for the conduction of lubricant thereto and to the bearings 52 and 53.

The guide bracket 55 is secured to the taper device supporting bracket 67 by the bolts 68.

The taper device supporting bracket 67 is secured to the carriage 12 by means of cap screws 69 (Figures 3 and 4), and aligned therewith by dowel pins (not shown). The supporting bracket 67 is provided with gibs 70 and 71, provided with retaining portions 72 and 73, respectively. Mounted in recesses in the gibs 70 and 71 are anti-friction bearing assemblies 74 of a special type, hereinafter described in detail. The upper surface of the supporting bracket 67 is also provided with anti-friction bearing assemblies 75.

The slide 76 rests upon the anti-friction bearing assemblies 75, and slides between the anti-friction bearing assemblies 74 mounted in recesses in the ways 70 and 71. The bearings 75 thus support the weight of the slide 76, whereas the bearings 74 resist the thrust upon the slide while the device is in operation. On the ends of the slide 76 are mounted the swivel clamps 77 and 78 (Figure 3), being secured thereby to the bolts 79. The swivel clamps 77 and 78 (Figure 6) are provided with overhanging arcuate edges, beneath which are arranged the opposite ends of the swivel 80. The swivel clamp 78 is additionally provided with an arcuate rack 81 meshing with a pinion 82 mounted upon a shaft 83, supported in the bracket 84 upon one end of the swivel 80 and having a hand wheel 85 for rotating the pinion 82. An index pointer 86 cooperates with scales 87 and 88 upon the swivel clamp 78 so as to indicate the amount by which the swivel 80 is displaced from its position parallel with the ways 11 of the lathe bed. The swivel 80 may be locked in any position of adjustment by tightening the bolts 79, thereby clamping the flanged edges of the swivel clamps 77 and 78 tightly down upon the ends of the swivel 80.

Secured to one end of the slide 76 is an anchor rod bracket 89 (Figure 3), as by the set screws 90. Threaded into a boss on this bracket 89 is one end of an anchor rod 91, the opposite end of which is threaded, as at 92. The threaded end 92 passes through a slot 93 in the outer end of a bed dog 94 and is provided with nuts 95 and 96 on opposite sides thereof. The bed dog 94 is clamped to the edge rib 97 (Figure 2) by means of the clamping bolts 98 and the clamping member 99 cooperating therewith. By loosening the bolts 98 the bed dog 94 may be slid along the edge rib 97 and clamped at any desired position. The slide 76 (Figure 7) is provided centrally with a swivel stud 100, upon which is threaded the retaining nut 101. The swivel stud 100 is provided with a head 102 which serves to provide a pivotal support for the opposite sides of the swivel 80. Engaging these opposite sides are anti-friction bearing assemblies 103, of a type similar to the bearings 74 and 75 and mounted upon the carriage shoe slide 104 (Figures 4 and 7), the center of which is provided with a bore 105 which serves to pivotally receive the stem portion 106 of the carriage shoe 54. A dust cover 107 is held in position by the washer 59, which in turn, is engaged by the nut 108 of the threaded stud 56. The carriage shoe 54 is likewise provided with anti-friction bearings 109 (Figure 9) engaging the guide members 110. The latter are secured at their opposite ends to the taper device supporting bracket 67 and guide bracket 55 by the screws 111 and dowel pins 112, and by the screws 113 and dowel pins 114, respectively, (Figures 3 and 4).

Arranged between the stem portion 106 and the bore 105 is a bearing bushing 115. Beneath this is a disc 116 secured to the stem 106 by the screws 117, and having a projecting portion entering the locating hole 118. The oil passages 119 serve to distribute lubricant to the bearing bushing 115 from the space 62. The guide members 110 and the swivel 80 are constructed from hardened steel, and the slide 76 is also provided with hardened steel bearing strips 151 and 152 secured thereto by the screws 153 for engagement by the anti-friction bearings.

The anti-friction bearing assemblies hitherto designated by the reference numerals 74, 75, 103 and 109, are shown more in detail in Figures 8 to 12, inclusive. Each bearing assembly consists of inner and outer annular races 120 and 121, respectively, with bearing balls 122 arranged therebtween. The inner race 120 is variously mounted, according to the location of the bearing assembly. In the bearing assemblies 74 the inner race 120 is mounted upon stud bolts 124 or 125. In the stud bolt 124 the portion upon which the inner race 120 of the single bearing is mounted is coaxial with the bearing race. The stud bolts 125, however, as shown in Figure 11, are provided with eccentric portions 126, upon which the inner race 120 is mounted. Consequently, the position of the bearing may be adjusted by loosening the nuts 127 and 128 (Figure 6), by which each stud bolt is held in position, whereupon the bolt may be turned until the bearing is shifted by a sufficient amount to bring it into engagement with the part which it supports. One bearing assembly 74 on the inner side of the slide 76 is mounted upon the plain or coaxial stud bolt 124, whereas the remainder of the bearing assemblies 74 are mounted upon eccentric stud bolts 125, as shown in Figure 4. By this means the bearing assemblies 74 can be accurately adjusted against the sides of the slide 76, the bearing assembly 74 upon the plain stud bolt 124 serving as a point of reference.

The bearing assemblies 75, supporting the weight and vertical thrust of the slide 76, are mounted in two different manners, as shown in Figure 4. The bearing assemblies 75 at the opposite ends of the supporting bracket 67 are mounted upon pins 129 secured in bearing brackets 130, attached by the cap screws 131 to the supporting bracket 67 (Figure 4). The bearing assemblies 75, arranged in the supporting bracket 67 between the opposite ends thereof (Figures 4 and 10), are mounted upon pins 130a, the opposite ends of which are secured in transverse bores 131a in sleeves 132, having flanges 133 by which the sleeves are held within the bores 134, as by the screws 135.

Two of the bearing assemblies 103 (Figure 8) are mounted within slots 136 in the corners of the carriage shoe slide 104, and are supported upon pins 137 in vertical bores 138. The other two bearing assemblies 103 are mounted upon the eccentric portions 139 of stud bolts 140, held in position by the nuts 141 and locknuts 142. By loosening the nuts 141 and 142 the eccentric stud bolts 140 may be rotated to adjust the clearance between the bearing assemblies 103 and the inner sides of the swivel 80.

The bearing assemblies 109 are similarly supported in slots 143 in the corners of the carriage shoe 54 (Figures 4 and 9). Two of these bearing assemblies 109 are mounted upon pins 144, whereas the other two are mounted upon the eccentric portions 145 of the stud bolts 146 having the nuts 147 and locknuts 148. By loosening the nuts 147 and 148, the stud bolts 146 may be rotated so that the clearance between the bearing assemblies 109 and the guide members 110 may be accurately adjusted.

Operation

The taper device of this invention may be connected or disconnected at will so that the lathe may be employed for turning straight work or for tapered work without removing the device.

In turning straight work the bolts 98 are loosened so that the bed dog 94 is capable of sliding along the rib 97. The nut 108 of the threaded stud 56 is tightened so as to lock the carriage shoe 54 to the guide members 110. This same action also holds the cross feed screw 29 stationary and takes the strain off the slides. Consequently, when the machine is started and the tool 44 is caused to move along the work-piece and cut a straight portion thereon, the entire taper device with its bed dog 94 moves along with the carriage 12, and offers no resistance to the turning operation being performed.

In turning tapered work, however, the swivel 80 is set at the desired angle of taper by turning the hand wheel 85 and setting the index pointer 86 opposite the proper graduations upon either of the scales 87 or 88. The swivel is then clamped in position by tightening the clamping bolts 79, thereby bringing the end clamps 77 and 78 tightly into engagement with the swivel 80. The bolts 98 of the bed dog 94 are also tightened, thereby anchoring the entire assembly to the bed of the machine. The clamping nut 108 upon the threaded stud 56 is loosened so as to free the carriage shoe 54 from its engagement with the guide members 110, and allowing the cross feed assembly to travel inwardly or outwardly according to the angle at which the swivel 80 is set. The cutting tool 46 may be set to any desired position by turning the hand wheel 25 (Figure 5), due to the telescoping arrangement of the cross feed screw shaft 29 within the sleeve 23, and without any interference of the one with the other.

As the carriage feeding mechanism is started the carriage shoe slide 104 moves along the space between the opposite sides of the swivel 80, which remains stationary by reason of its being anchored to the lathe bed through the anchor rod 91 and bed dog 94. In the arrangement shown in Figures 1 and 3, assuming that the carriage moves to the right, the carriage shoe slide 104 will move toward the back edge of the machine, thereby pulling the carriage shoe 54 and the cross feed screw 29 likewise toward the back of the machine. Through the connection of the cross feed screw with the nut 38, the bottom slide 37 is pulled toward the work-piece 15, causing the compound slide 40 and the tool 44 to move into engagement with the work-piece and to describe an oblique path parallel to the path followed by the shoe slide 104 within the swivel 80.

For turning work-pieces having both straight and tapered portions, the bed dog nut 95 may be loosened and moved to the right a sufficient distance to free it from engagement with the bed dog 94. The nut 96, however, is set at a position corresponding to the location where it is desired to have the beginning of the taper. Consequently, during the initial part of the motion of the carriage the slide 76 moves as a unit with the carriage 12, the anchor rod 92 sliding loosely through the slot 93 in the end of the bed dog 94 until the nut 96 is reached. When this occurs the motion of the slide 76 is immediately halted and the taper devices begin their operations. The carriage shoe slide 104 then begins to pursue an oblique path between the opposite sides of the swivel 80, in the manner previously described, and the tool 44 begins to cut a tapered portion upon the work-piece 15.

It will be understood that we desire to comprehend within our invention such modifications as come within the scope of the claims and the invention.

Having thus fully described our invention, what we claim as new and desire to secure by Letters Patent, is:

1. In a machine tool, a cutting tool, means for rotating a work-piece, means for moving said cutting tool relatively to said work-piece, a guiding member, a following member engaging said guiding member, an element pivotally engaging said following member, a cross feed screw adapted to operatively interconnect said pivotal element and said cutting tool, anti-friction bearing devices arranged between said guiding member and said following member, each anti-friction bearing device having multiple rotary bearing elements, and means for driving said cross feed screw arranged to permit axial motion of said screw.

2. In a machine tool, means for rotating a work-piece, a longitudinally movable carriage, a cross slide thereon, a cross feed screw arranged to move said cross slide, a cutting tool associated with said cross slide, means for rotating said cross feed screw, a guiding member having a movable guideway adapted to be adjusted to positions disposed at angles to the axis of rotation of said work-piece, a following member adapted to engage said guideway, means interconnecting said following member and said cross feed screw, and devices for releasably locking said cross feed screw against rotation.

3. In a machine tool, means for rotating a work-piece, a longitudinally movable carriage, a cross slide thereon, a cross feed screw arranged to move said cross slide, a cutting tool associated with said cross slide, means for rotating said cross feed screw, a guiding member having a movable guideway adapted to be adjusted to positions disposed at angles to the axis of rotation of said work-piece, a following member adapted to engage said guideway, means interconnecting said following member and said cross feed screw, and devices for releasably locking said cross feed screw against rotation, said cross feed screw rotating means being adapted to telescopically receive said cross feed screw to permit axial motion thereof.

CLIFFORD A. BICKEL.
KURT H. WILLS.